(12) United States Patent
Reiker (10) Patent No.: US 6,204,450 B1
(45) Date of Patent: *Mar. 20, 2001

(54) ELECTRICAL BOX WITH FIXTURE SUPPORT HAVING FITTED PORTION

(75) Inventor: Kenneth H. Reiker, Shalimar, FL (US)

(73) Assignee: Reiker Enterprises of Northwest Florida, Inc., Solvay, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,141

(22) Filed: Aug. 1, 1997

Related U.S. Application Data (63) Continuation-in-part of application No. 08/862,379, filed on May 23, 1997, now Pat. No. 5,965,845, said application No. 08/905,141, is a continuation-in-part of application No. 08/490,757, filed on Jun. 15, 1995, now Pat. No. 5,677,512, said application No. 08/905,141, is a continuation-in-part of application No. 08/371,695, filed on Jan. 12, 1995, now Pat. No. 5,854,443.

(60) Provisional application No. 60/023,060, filed on Aug. 2, 1996, and provisional application No. 60/018,227, filed on May 24, 1996.

(51) Int. Cl.⁷ .................................................. H01H 9/02
(52) U.S. Cl. ........................ 174/58; 174/62; 220/3.3; 220/3.9; 248/906
(58) Field of Search .......................... 174/51, 58, 61, 174/62, 48, 53, 57; 220/3.2, 3.3, 3.8, 3.9; 248/906, 205.3

(56) References Cited

U.S. PATENT DOCUMENTS

| | | |
|---|---|---|
| Re. 33,147 | 1/1990 | Reiker . |
| Re. 34,603 | 5/1994 | Caison et al. . |
| 950,176 | 2/1910 | Hublinger . |
| 1,040,175 | 10/1912 | Earhart . |
| 1,824,708 | 9/1931 | Davis et al. . |
| 2,454,962 | 11/1948 | Brown . |
| 2,914,601 | 11/1959 | Fuss . |
| 2,959,633 | 11/1960 | Palmer et al. . |
| 3,104,087 | 9/1963 | Budnick et al. . |
| 3,168,613 | 2/1965 | Palmer . |
| 3,214,126 | 10/1965 | Roos . |
| 3,340,349 | 9/1967 | Zerwes . |
| 3,616,096 | 10/1971 | Roeder . |
| 4,050,603 | 9/1977 | Harris et al. . |
| 4,062,512 | * 12/1977 | Arnold .............................. 220/3.9 X |
| 4,176,758 | 12/1979 | Glick . |
| 4,275,862 | 6/1981 | Takagi et al. . |
| 4,281,773 | * 8/1981 | Mengeu ................................ 220/3.2 |
| 4,331,832 | * 5/1982 | Curtis et al. . |

(List continued on next page.)

FOREIGN PATENT DOCUMENTS

| | | |
|---|---|---|
| 2 436 518 | 5/1980 | (FR) . |
| 1 309 950 | 3/1973 | (GB) . |

*Primary Examiner*—Dean A. Reichard
(74) *Attorney, Agent, or Firm*—Shlesinger, Arkwright & Garvey LLP (57) ABSTRACT

A mounting assembly includes a junction box having a top wall and a side wall. The side wall extends downwardly away from the top wall and defines a cavity therein. A fixture support is disposed in the cavity. A recess or removed portion is provided on the support, and the removed portion is configured for receiving the inner face of the radiused portion of the box disposed between the top wall and side wall so as to not interfere therewith. A threaded hole for receiving fasteners of a fixture to be supported thereby may be provided on the fixture support. Preferably, the fixture support is sufficiently smooth for preventing wear to plastic-coated electrical wire which engages exposed surfaces of the fixture support.

88 Claims, 4 Drawing Sheets

U.S. PATENT DOCUMENTS

| | | |
|---|---|---|
| 4,538,786 | 9/1985 | Manning . |
| 4,770,311 * | 9/1988 | Wang ..................................... 220/3.3 |
| 4,892,211 | 1/1990 | Jorgensen . |
| 4,909,405 | 3/1990 | Kerr, Jr. . |
| 4,919,292 * | 4/1990 | Hsu ....................................... 220/3.2 |
| 4,960,964 * | 10/1990 | Schnell et al. ......................... 174/51 |
| 4,988,067 | 1/1991 | Propp et al. . |
| 5,074,515 | 12/1991 | Carter, Jr. . |
| 5,303,894 | 4/1994 | Deschamps et al. . |
| 5,435,514 | 7/1995 | Kerr, Jr. . |
| 5,762,223 | 6/1998 | Kerr, Jr. . |
| 5,860,548 | 1/1999 | Kerr, Jr. . |

* cited by examiner

ELECTRICAL BOX WITH FIXTURE SUPPORT HAVING FITTED PORTION

CROSS-REFERENCE TO RELATED APPLICATIONS

This application is a continuation-in-part of application Ser. No. 08/862,379, filed May 23, 1997, now U.S. Pat. No. 5,965,845, issued Oct. 12, 1999, which claims the priority of application Ser. No. 60/023,060, filed Aug. 2, 1996, and which application Ser. No. 08/862,379 claims the priority of application Ser. No. 60/018,227, filed May 24, 1996, and this application is a continuation-in-part of application Ser. No. 08/490,757, filed Jun. 15, 1995, now U.S. Pat. No. 5,677,512, issued Oct. 14, 1997, and this application is a continuation-in-part of application Ser. No. 08/371,695, filed Jan. 12, 1995, now U.S. Pat. No. 5,854,443, issued Dec. 29, 1998, and each of which is incorporated herein by reference.

This application likewise relates to four (4) concurrently filed applications; namely, application Ser. No. 08/905,142, filed Aug. 1, 1997, now U.S. Pat. No. 5,981,874, issued Nov. 9, 1999, and application Ser. No. 08/905,077, filed Aug. 1, 1997, now U.S. Pat. No. 5,907,124, issued May 25, 1999, and application Ser. No. 08/904,691, filed Aug. 1, 1997, and application Ser. No. 08/904,869, filed Aug. 1, 1997, now U.S. Pat. No. 5,883,331, issued Mar. 16, 1999, and each of which is incorporated herein by reference.

FIELD OF THE INVENTION

The present invention relates to electrical boxes and methods of producing the same.

BACKGROUND OF THE INVENTION

Consumers, updated National Electrical Codes (NEC), and Underwriter Laboratories (UL) requirements all require that electrical boxes be made stronger than in the prior art.

OBJECTS AND SUMMARY OF THE INVENTION

An object of the invention is to overcome the drawbacks of known electrical boxes.

A further object of the invention includes making electrical boxes which use the standard punched-out, stamped electrical boxes in a more intelligent fashion.

Yet another object of the invention is to take out the radius of a standard industry size electrical box so that a support for supporting a fixture can be located the proper distance from a second support to meet National Electrical Code (NEC) standards.

Another object of the invention is to eliminate the problem of the upper radius between the top wall and side wall of electrical boxes that prevents fixture supports or studs from being fitted next to the inside face of such side walls.

Another object of the invention is to achieve a strengthened electrical box with a supplemental support within a standard so-called "4×4" box, while maintaining the near universal 3.5 inch (8.9 cm) spacing between the fixture supports so that the box is usable with standard light fixtures, ceiling fans, and the like.

It is likewise an object of the invention to provide supplemental supports in the electrical boxes to enhance the carrying strength of the electrical boxes.

Yet another object of the invention is to provide studs in the electrical boxes which cover the threads of standard screws so that no screw threads are present in the interior of such electrical boxes.

A still further object of the invention is to provide an electrical box having a supplemental support with a sufficiently smooth exterior for preventing wear to the plastic coating of plastic-coated electrical wire.

It is yet another object of the invention to provide electrical boxes in which added supports, such as studs, are added during the manufacturing process to eliminate problems in prior art electrical boxes, as well as to strengthen the inventive electrical boxes.

Another object of the invention is to provide a junction box having a supplemental support, yet which requires no welding during assembly thereof.

Yet another object of the invention is to provide an electrical box having components which are easily fabricated, added to the electrical box, and assembled in the final form by the operation of screwing or riveting, yet which do not loosen when subjected to static and/or dynamic loading.

A still further object of the invention is to provide a junction box in which the supplemental support for carrying static and dynamic loads automatically engages the side walls of the junction box during assembly and/or in use thanks to the use of cutouts or radiused portions in the top portions of the support and/or thanks to the auxiliary support being configured for engaging the side wall thereof when the auxiliary support is attached and located in its attached, final form ready for use.

A still further object of the invention is to provide a junction box capable of carrying static and/or dynamic loads having an auxiliary support and that is assembled with fewer parts and with fewer steps than known devices.

It is a yet further object that all the above be carried out with an electrical box which carries the load of supported static and dynamic fixtures better than known electrical boxes.

In summary, the present invention is directed to an electrical junction box or mounting assembly which includes a box having a top wall and a side wall. The side wall extends downwardly away from the top wall and defines a cavity therein. A supplemental fixture support is disposed in the cavity. A radiused, cutout, or removed portion is provided in the top portion of the support, and the supplemental fixture support may abut the inner side wall of the box and/or the fixture support may abut some or all of the radiused portion of the box between the side wall and top wall of the box. A threaded hole may be provided on the supplemental fixture support. The supplemental fixture support may be a rivet. Preferably, the supplemental fixture support has a sufficiently smooth exterior for preventing wear to plastic-coated electrical wire which engages exposed surfaces of the fixture support.

These objects and advantages as well as others will be readily apparent from a review of the following description and drawings.

The drawings show a variety of embodiments of the invention, as will be clear from reading the description below.

It is important to note that the use of relative terms such as "up" and "down", and "left" and "right" is for convenience only and is not intended to be limiting.

DESCRIPTION OF THE PRIOR ART

Figure 1:
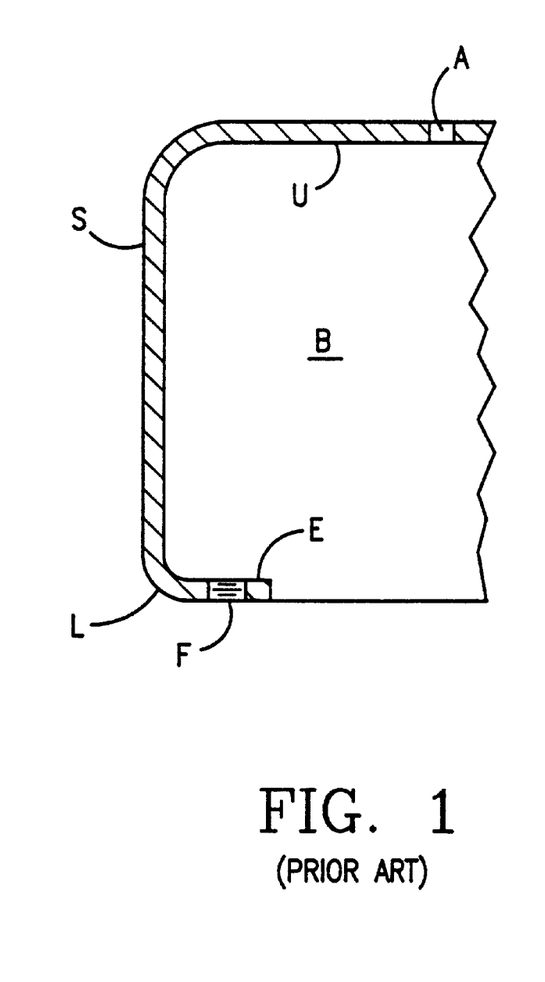
FIG. 1 is a cross sectional view of a PRIOR ART electrical junction box having an inwardly extending ear E with a face plate attachment hole F provided therein.

FIG. 1 shows a PRIOR ART junction box including a side wall S, an upper wall U, and an ear E extending from a lower portion L thereof.

Upper wall U has one or more attachment holes A through which fasteners will be inserted for attaching PRIOR ART electrical box B to an overhead surface, such as to a ceiling joist or piece of plywood extending therebetween.

A lower, faceplate attachment hole F is typically provided in inwardly extending ear E. Frequently, faceplate hole F is provided with threads for mating with respective faceplate fasteners when securing an unillustrated faceplate thereto. Such faceplates are used to enclose electrical box B after the wiring inside the electrical box/junction box B has been completed.

A drawback of such PRIOR ART electrical boxes E is that they are typically made with stamped sheet metal extensions E; consequently, extensions E are relatively thin (i.e., in the order of about 1 millimeter or less). Such extension or ear E has a width of only a few millimeters, and only extends several millimeters inside box B. Thus, the surface area of ear E, when viewed from below after installation of upper wall U against a typical horizontal ceiling, is often substantially less than one centimeter squared (1 cm$^2$).

Consequently, ear E may only carry relatively small vertical loads, when installed against the ceiling, as described above.

As a result, local codes frequently allow such PRIOR ART boxes B to be used only for supporting the weight of a faceplate, or of a relatively light static load, such as a small light fixture.

Such electrical boxes B are unsuited for supporting large static loads, as well as for supporting large dynamic loads, such as ceiling fans which may weigh twenty-five kilograms or more (25 kg).

Thus, there is a need for an electrical box which is suited for carrying relatively large static loads as well as dynamic loads.

That need is especially clear, given that many homeowners want to install heavier light fixtures and dynamic loads, such as ceiling fans, than had exhibited such preferences in the past.

Furthermore, even if the initial owner/builder of a house or commercial space provides PRIOR ART load-carrying junction boxes B suited for carrying the vertical force of a small light fixture, a subsequent owner/user will often replace the original light fixture with a heavier light fixture, or with a dynamic load; i.e. a ceiling fan.

Accordingly, there is a need for a load-carrying junction box which is suited for a wide range of static and dynamic loads and, thus, suited for original installation in new construction, given that some users fail to upgrade load-carrying junction boxes when adding heavier static and/or dynamic loads to the box.

The electrical box according to the invention has overcome these drawbacks described immediately above, and has achieved the objects of the invention detailed above. Such will be evident when reading the following detailed description of the invention.

DETAILED DESCRIPTION OF THE INVENTION

Figure 2:
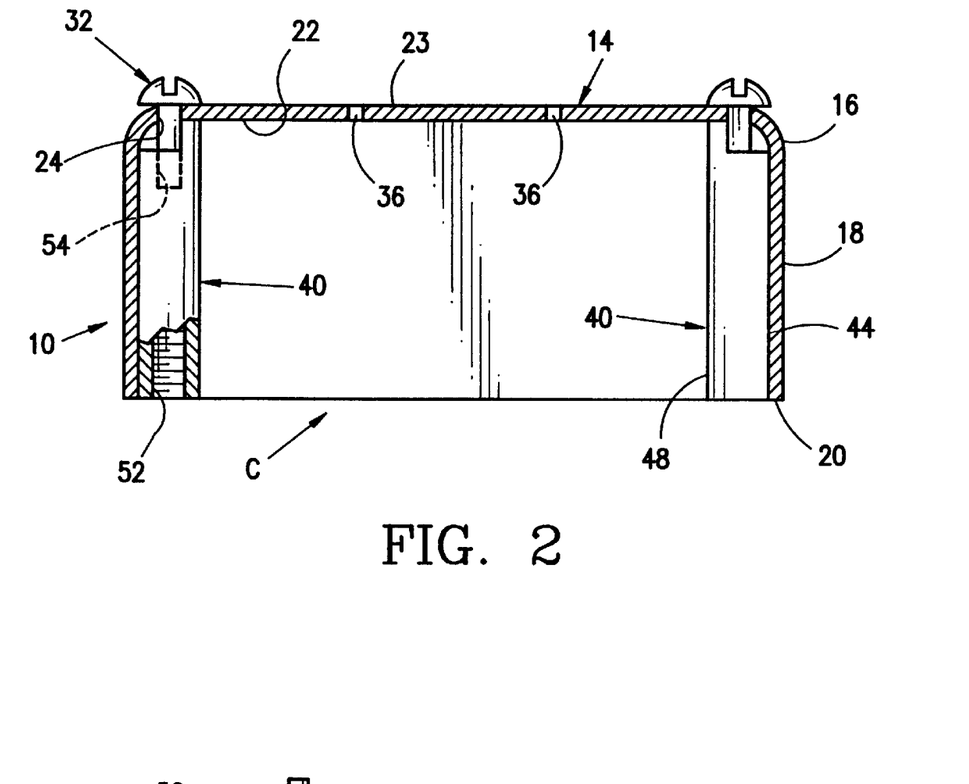
FIG. 2 is a cross-sectional view of a preferred embodiment of an electrical junction box according to the invention showing the use of fasteners to secure a supplemental support to the junction box.

Turning to FIG. 2, a first preferred embodiment of an electrical box and/or junction box 10 according to the invention will now be described in detail.

Junction box 10 includes a top wall 14, and a side wall 18 extending downwardly therefrom and defining a cavity therein. A radiused portion extends between top wall 14 and side wall 18, and defines an inner radiused portion 16 facing the interior or cavity C of box 10. Side wall 18 includes a lower free edge 20, and top wall 14 includes a lower face 22 and an upper face 23.

Preferably, one or more holes 24 are provided on top wall 14, for example. In FIG. 2, two (2) holes 24 will be for receiving a fastener 32 therethrough.

Additional holes 36 for receiving portions of an electrical fixture, for example, and/or for fasteners which secure junction box 10 to a ceiling, for example, may likewise be provided.

Figure 2A:
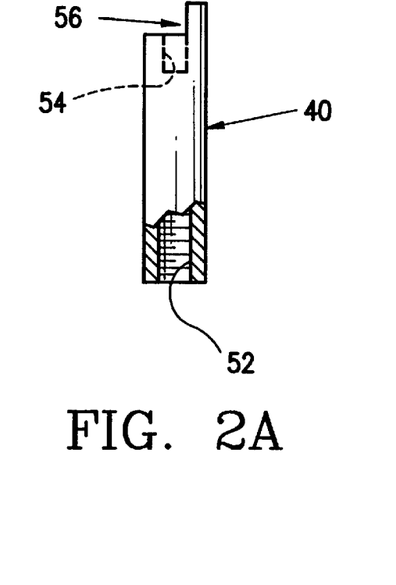
FIG. 2A a side view of the support of FIG. 2.
Figure 2B:
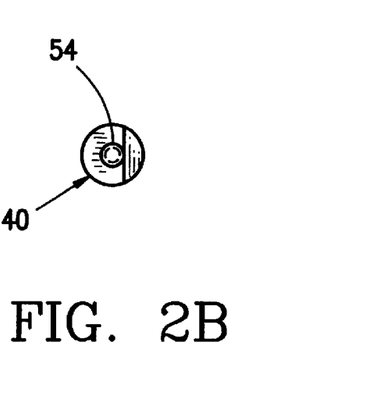
FIG. 2B is a top plan view of the support of FIG. 2A.

FIGS. 2A and 2B illustrate supplemental support or stud 40 of FIG. 2 which may be provided for increasing the holding strength of junction box 10.

Supplemental support 40 may be made with a height substantially equal to the distance between lower free edge 20 and lower face 22 of top wall 14.

When increased resistance to inadvertent turning of supplemental support 40 about the longitudinal axis of fastener 32 is desired, supplemental support 40 may be provided with a face 44 configured for engaging with a portion of side wall 18 for restricting rotation of supplemental support 40. Configured face 44 may be made as a flat face. The non-configured exterior face of supplemental 40 may be made as a rounded face 48, as shown.

Good results have been achieved when a threaded hole 52 is provided extending at least partially through supplemental support 40. Preferably, threaded hole 52 has threads selected to mate with threads of fasteners from standard fixtures such as lights and ceiling fans.

Supplemental support 40 may be attached to box 14 by use of a powered screwdriver driving (i.e., turning) fastener 32 into an upper threaded hole 54. The threads of threaded hole 52 may extend all the way through support 40, for example, so that the same threads which attach screw 32 are used to attach the unillustrated fastener of a light fixture or ceiling fan.

It is likewise contemplated that threads will only be provided at the top portion of support 40, at the bottom portion of support 40, or at both top and bottom portions with an unthreaded region in between.

Still further, it is expected that threads 54 for mating with fastener 32 may be of a different size than threads 52 provided for mating with the fasteners which attach the ceiling fan or light fixture to the lower portion of support 40 when in use.

Support 40 may have a variety of external configurations as well, such as being a hexagonal supplemental support 40, a triangular supplemental support 40, and other configurations which achieve the objects of the invention.

Good results have been achieved when an upper portion of supplemental support 40 is removed to define a fitted portion 56. Fitted portion 56 is sufficiently large so as to not interfere with/engage the inner radiused portion 16 of box 10 when support 40 is installed. In that manner, support 40 may be located substantially adjacent to sidewall 18, so that sidewall 18 also assists in prevention of outward movement of support 40 that might lead to a loosening of the connection between fastener 32 and top wall 14, and undesirable loosening of the support 40 relative to box 10. It is not necessary for support 40 to engage side wall 18.

When two supports 40 are attached to the left and right ones of holes 28, the provision of fitted portion 56 of support 40 yields the added benefit of achieving a standard center-to-center spacing between respective threads 52 of each of the two supported supports, even when using a "standard" box forming equipment for making a standard box size, as discussed in greater detail below. Such also has the benefit of allowing use of standard equipment for forming holes in a sheetrock ceiling for receiving the box, while maintaining the standard 3.5 inch fixture support.

For large-scale production, a powered screwdriver can be used to assist in fabrication by attaching support 40 to the wall of the electrical box 10.

Figure 3:
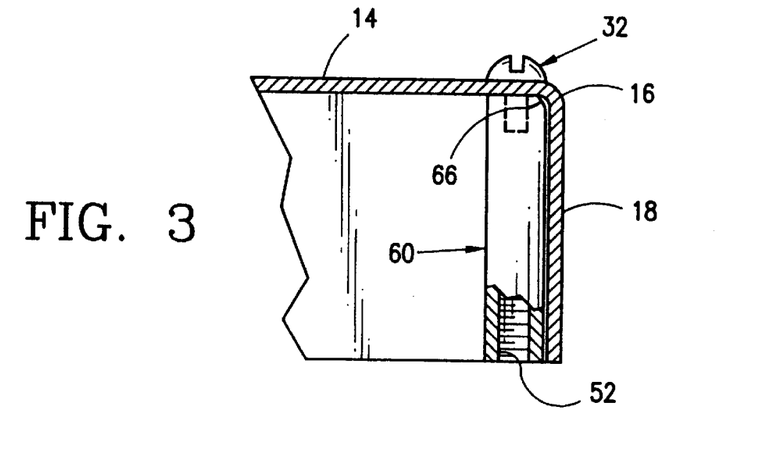
FIG. 3 is a cross-sectional view of another preferred embodiment of a junction box according to the invention.

FIG. 3 illustrates another preferred embodiment of the invention in which a support 60 is attached to top wall 14 by use of fastener 32 in substantially the same manner as in the embodiment of FIG. 2.

Support 60 includes a removed or radiused or rounded portion 66 which allows support 60 to be placed adjacent and/or in direct contact with side wall 18, top wall 14, and the inner radius of radius 16 which joins top wall 14 and side wall 18.

Rounded portion 66 may be formed so as to snuggly mate with the inner face of radiused portion 16.

Figure 4:
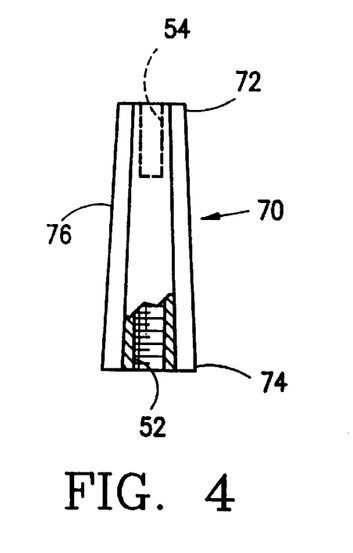
FIG. 4 is a side view of another preferred embodiment of a support according to the invention.

FIG. 4 illustrates yet a further preferred embodiment of a support 70 according to the invention. Support 70 is formed as a truncated, hexagonal pyramid having a top portion 72 and a lower portion 74. Threads 52 and 54 are provided as in the above-described embodiments.

Given that upper portion 72 has a smaller cross-sectional area than lower portion 74, upper portion 72 being the upper, truncated portion of the illustrated hexagonal pyramid, the outer surfaces of upper portion 72 are disposed inwardly of the outer surfaces of lower portion 74, with respect to the longitudinal center line of support 70. Hence, when installed, a tapered side 76 will be selected so as to be sufficiently tapered that upper portion 72 is free of interference with the inner face of radiused portion 16 of junction box 10.

Figures 5, 6:
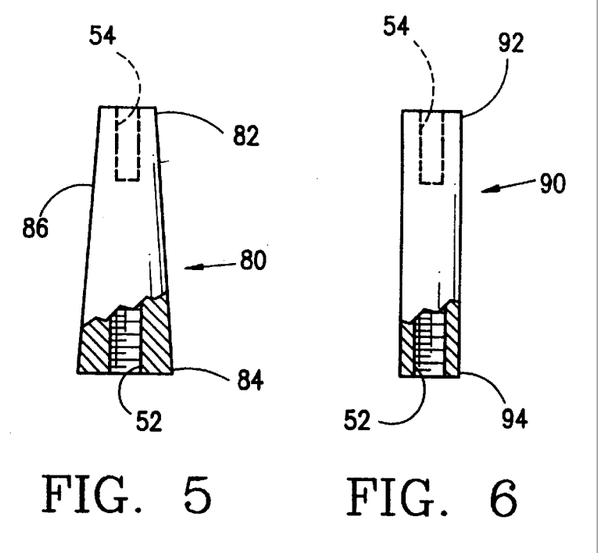
FIG. 5 is a side view of yet another preferred embodiment of a support according to the invention.
FIG. 6 is a side view of yet another preferred embodiment of a support according to the invention.

In a similar fashion, FIG. 5 illustrates yet another preferred embodiment of a support 80 according to the invention. Support 80 is in the form of a truncated cone having an upper portion 82 disposed inwardly of the outer extent of a lower portion 84. Tapered side wall 86 is preferably selected so that upper portion 82 does not engage with the inner face of radiused portion 16, when support 80 is installed in electrical box 10.

Figure 7:
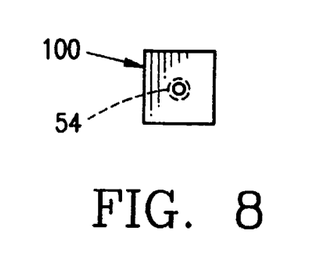
FIG. 7 is a top plan view of the support of FIG. 6.

FIGS. 6 and 7 illustrate another preferred embodiment of a support 90 which has a substantially rectangular cross-section, as best seen in FIG. 7. A top portion 92 is fitted against lower face 22 of box 10 and a bottom portion 94 is substantially aligned with bottom free edge 20 of box 10, in use. Fastener 32 engages with threads 54 and secures support 90 to box 14.

Figure 8:
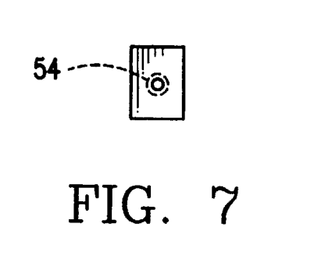
FIG. 8 is a top plan view similar to FIG. 7 of a further preferred embodiment of a support, similar to the embodiment of FIG. 6.

FIG. 8 shows another preferred embodiment of a support 100 having a substantially square cross section in top plan view, the side elevational view being substantially the same as that shown for the embodiment of FIG. 6.

It will be appreciated that the rectangular and square cross-sectional areas of the embodiments of FIGS. 7 and 8, for example, must be sufficiently small so as to not interfere with the inner faces of radiused portion 16 of box 10 when in use. However, the cross-sectional areas must be sufficiently large so that the desired holding strength is obtained. One may consider the embodiments of FIGS. 6–8 to have removed portion which extend substantially the entire length (i.e., height) of supports 90 and 100, respectively. It is also contemplated that other right self-polygonal cylinder, right circular cylinders, and the like, along the lines of the embodiments of FIGS. 6–8 may be used.

In addition, removed portions may be defined in any of the above supports 40, 60, 70, 80, 90 and 100 along the lines of removed portion 56 of support 40 of FIG. 2.

Figures 9, 10:
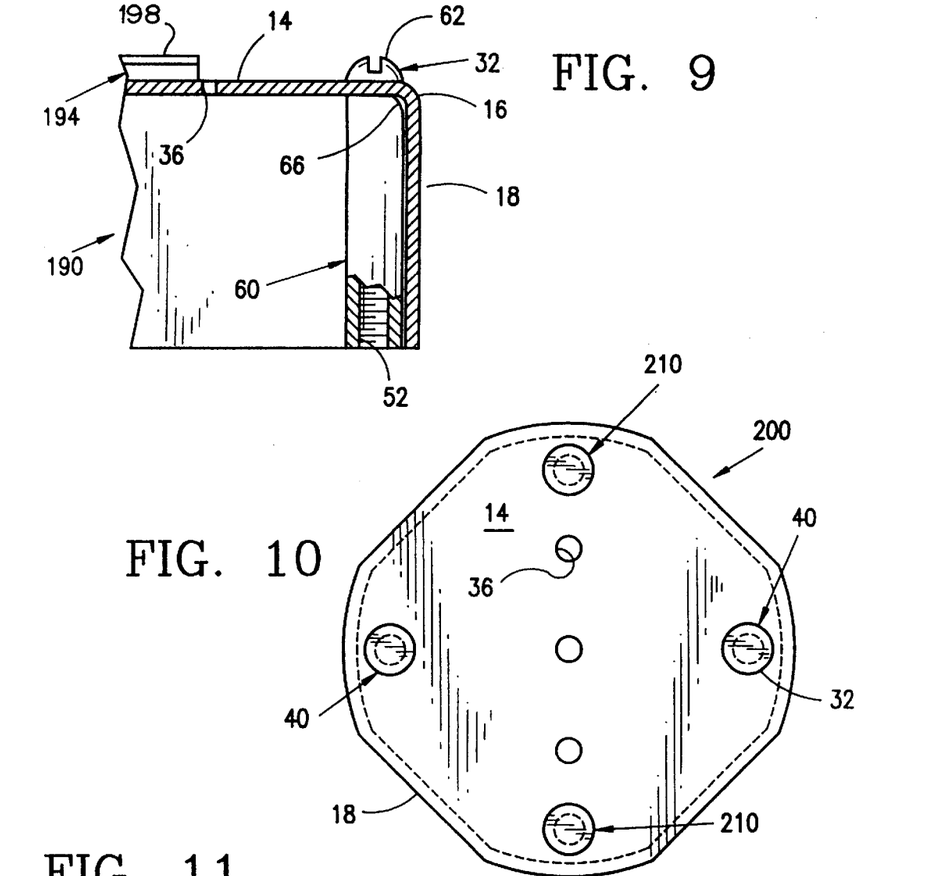
FIG. 9 is a side view of yet another preferred embodiment of a junction box according to the invention.
FIG. 10 is a top plan view of another preferred embodiment of a box.

FIG. 9 shows another preferred embodiment of a junction box 190 according to the invention.

Junction box 190 includes a piece of double-sided tape 94 on top wall 14 thereof. Double-sided tape 194 may be provided with a protective strip or layer 198 on the outer face thereof, i.e., on the face of double-sided tape 194 that has not been adhered to junction box 190. Conventional double-sided tape 194 may be used.

Alternative means for adhering junction box 190 to a surface may be used, such as spray-on adhesive, a piece of putty and other adhering means. Such adhesive may be as described in my earlier U.S. patent application Ser. No. 08/490,757, filed Jun. 15, 1995, now U.S. Pat. No. 5,677,512 and Ser. No. 08/371,695, filed Jan. 12, 1995, each of which is incorporated herein by reference, and such adhesive may be utilized in conjunction with or instead of the double-sided tape 194.

One of the many advantages of junction box 190 is that the user may remove protective layer 198, and then adhere double-sided tape 194 to the surface to which junction box 190 is to be attached. Double-sided tape 194 is selected and sized so that sufficient holding power for temporarily adhering junction box 190 to the surface is achieved, while the user has both hands free for permanently attaching junction box 190 in the desired location by nails (or shooting screws) through one or more holes 36.

Preferably, the adhesive is sufficiently strong to adhere box 190 to a downwardly facing horizontal surface located above the user's head.

The thickness of double-sided tape 194 is coordinated with the thickness (i.e., height) of head 62 of bolt 32 so that each performs its intended function, when junction box 190 is provided with screw 32 of FIG. 3.

In a like manner, the height of the external portion of other supplemental supports will be coordinated with the thickness of adhesive material or double-sided tape 194. For example, when screw 32 is used with junction box 190, the thickness of double-sided tape 194 typically will be selected to be at least as high, and preferably in most cases, higher than such height.

Alternatively, when attaching box 190 to a stud having a width less than the distance between left and right heads 62, double-sided tape 194 need not extend away from top wall 14 a distance greater than the height of heads 62. That is because the stud would fit in between the offset left and right heads 62.

It will be appreciated that a lock washer may be provided between head 64 and top wall 14 to keep screw 32 from loosening. Such has the further advantage of restricting the tendency of fastener head 62 (and the entire fastener 32 and associated support 60) to move within a vertical plane, and helps maintain the integrity of the initial connection between fastener 32 and junction box 190; e.g., the connection between both top wall 14 and head 62, and between both top wall 14 and support 60.

Still further, restricting such tendency of fastener 40 to rotate within a vertical plane helps to ensure that supplemental support 60 extends substantially parallel to side wall 18 of junction box 190 before and during use. Needless to say, all those aspects of fine-tuning of the connection between support 60 and the remainder of junction box 190 are geared for achieving predictability of where lower portion 62 of fastener 40 is, regardless whether support 60 is intended to run parallel to side wall 18 or at an angle relative thereto so that threads 52 are in the proper location.

Needless to say, the disclosed connections and configurations act to restrict all movements between support 60 and the remainder of box 190. The above discussion regarding restriction of movement within a "vertical" plane is merely an example.

By restricting movement of support 60, there is achieved the desired predictability of where the lower portion of female thread 52 is located so that the desired spacing between a left hand one of supplemental support 60 and a right hand one of supplemental support 60 is achieved. Typically, the spacing between the commonly provided two (2) female threads 52 (i.e., left and right ones of supports 60) as shown in the side views of FIGS. 2, 3 and 9 will be achieved. Known light fixtures, for example, are provided with respective left and right male fasteners, three-one half (3½) inches on center, which will be mated with such left and right female fasteners 52, during final use of the illustrated junction boxes.

All the advantages described regarding the stabilizing of fastener 52 and, hence, supplemental support 40, relative to the remainder of junction box 190 hold true for all the other preferred embodiments of the invention.

Figure 11:
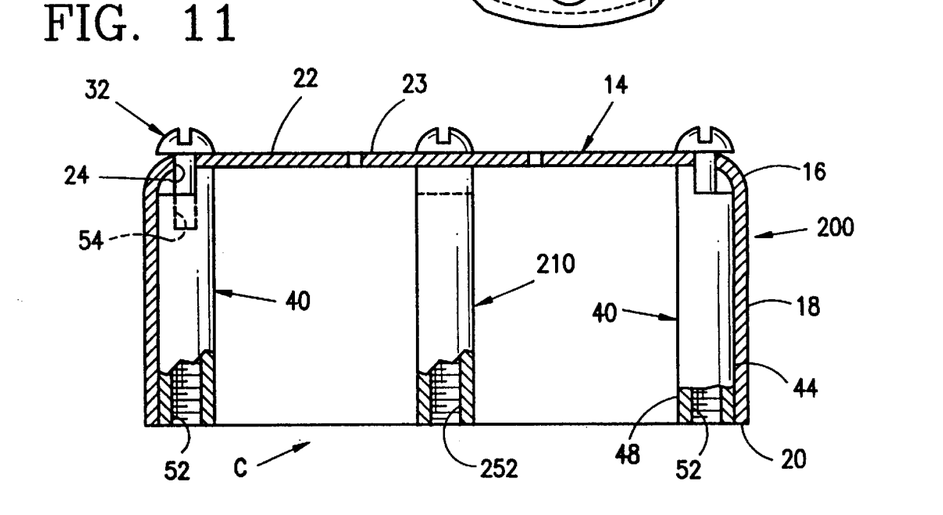
FIG. 11 is a side view of FIG. 10.

FIGS. 10 and 11 illustrate yet another preferred embodiment of a junction box 200 according to the invention.

Junction box 200 includes two (2) spaced apart supports 40, of the type as described above. In addition, there are two (2) additional support 210 spaced apart from supports 40. Supports 210 have fixture fastener receiving threads at lower portions thereof which preferably have a different thread size than the thread size of thread 52 of support 40. For example, thread 52 of support 40 may be provided with 8-32 threads and the threads of supports 210 may be provided with 10-32 threads. Those two (2) different thread sizes are typical for use in mounting light fixtures and ceiling fans. For most applications, the supports 210 having the same fixture fastener threads will be located on opposite sides of the box, as shown, and support 40 having the same thread sizes will likewise be located on opposite sides of the box.

Alternatively, it is contemplated that, depending on the box configuration, and intended use, one support 210 will be located substantially adjacent one support 40 on one side of the box and the other supports, i.e., the other support 210 and support 40 will be located on substantially the other side of the box, so that the typical spacing of the paired mating fastener threads will be achieved.

As to supplemental supports, such as the illustrated supports 40, 60, 70, 80, 90, 100 and 210, it is likewise contemplated that such supplemental supports will have fully round cylindrical shapes, hexagonal-shapes, square shapes, shapes which are tapered at an upper portion thereof. In addition, frustrums of pyramids and the other shapes are contemplated with truncation taken at angles other than the illustrated angles and removed portions, and other than the illustrated substantially right angle between the top face of respective supplemental supports 40, 60, 70, 80, 90, 100 and 210 that contacts the lower face 22 of upper wall 14 of the various preferred embodiments of the junction box according to the invention.

In addition to the screws used in the embodiments described above, it is expected that bolts or locking coupling nuts will be used to attach supplemental supports to the junction box, as well as any other means of fastening supplemental supports to the junction box in a sufficiently secure manner so as to achieve the objects of the invention.

It will be appreciated that these are merely examples of solutions to the problems set forth in my accompanying drawings and description, and, taken in its entirety, it will be appreciated that all the above objects of the invention, as well as many others, have been fulfilled.

It will likewise be appreciated that all the components described in the foregoing can be made of a variety of materials, such as steel, zinc, nylon, and other plastics, as the producer and user demand.

While this invention has been described as having a preferred design, it is understood that it is capable of further modification, uses and/or adaptations following in general the principle of the invention and including such departures from the present disclosures as come within known or customary practice in the art to which the invention pertains, and as may be applied to the essential features set forth, and fall within the scope of the invention or the limits of the appended claims.

I claim:

1. A mounting assembly, comprising:

a) a junction box including a top wall and a side wall;

b) said side wall extending downwardly away from said top wall and defining a cavity therein;

c) a fixture support extending into said cavity;

d) said fixture support having an exposed surface which is sufficiently smooth for avoiding wear to plastic-coated electrical wire which engages said exposed surface when said junction box is in use; and e) a fastener fixedly securing said fixture support to said top wall;

f) said fixture support is disposed so that forces exerted by a fixture supported thereby are transferred substantially directly to said top wall of said junction box.

2. A mounting assembly as defined in claim 1, wherein:

a) a fastener is disposed adjacent said top wall and said fixture support for securing said fixture support to said top wall.

3. A mounting assembly as defined in claim 1, wherein:
a) said fixture support engages a portion of said side wall.
4. A mounting assembly as defined in claim 1, wherein:
a) a male fastener is disposed adjacent said top wall and said fixture support for securing said fixture support to said top wall.
5. A mounting assembly as defined in claim 4, wherein:
a) said male fastener includes a bolt.
6. A mounting assembly as defined in claim 5, wherein:
a) said bolt has substantially no exposed threads.
7. A mounting assembly as defined in claim 1, wherein:
a) said fixture support has an exposed surface which is sufficiently smooth for avoiding wear to plastic-coated electrical wire which engages said exposed surface when said junction box is in use.
8. A mounting assembly as defined in claim 1, wherein:
a) a top threaded hole is provided on a top portion of said fixture support; and
b) a bottom threaded hole is provided on a bottom portion of said fixture support.
9. A mounting assembly, comprising:
a) a unction box including a top wall and a side wall;
b) said side wall extending downwardly away from said top wall and defining a cavity therein;
c) a fixture support;
d) said fixture support being disposed adjacent said side wall;
e) a fastener being disposed adjacent said top wall and said fixture support for securing said fixture support to said top wall;
f) a recess provided in an upper portion of said fixture support; and
g) said recess being configured for preventing interference between said upper portion of said fixture support and said junction box when said fastener secures said fixture support to said top wall.
10. A mounting assembly as defined in claim 9, wherein:
a) said recess is provided with a radiused portion; and
b) said radiused portion is disposed adjacent an inner face of a radiused portion of said unction box disposed between said top wall and said side wall.
11. A mounting assembly as defined in claim 9, wherein:
a) said fixture support engages said side wall when said fastener secures said fixture support to said top wall.
12. A mounting assembly as defined in claim 9, wherein:
a) said fixture support extends substantially the entire length from said top wall of said junction box to a bottom portion thereof.
13. A mounting assembly, comprising:
a) a junction box including a top wall and a side wall;
b) said side wall extending downwardly away from said top wall and defining a cavity therein;
c) a fixture support disposed in said cavity, said fixture support including an upper portion disposed adjacent said top wall;
d) a truncated portion provided on said support; and
e) said truncated portion being configured for preventing interference between said upper portion of said fixture support and said side wall of said junction box.
14. A mounting assembly as defined in claim 13, wherein:
a) said fixture support extends substantially parallel to said side wall.
15. A mounting assembly as defined in claim 9, wherein:
a) a second fixture support is disposed in said cavity.
16. A mounting assembly as defined in claim 15, wherein:
a) said fixture support is configured for securing a first size of fixture fastener thereto.
17. A mounting assembly as defined in claim 16, wherein:
a) said second fixture support is configured for securing a second size of fixture fastener thereto, the second size of fixture fastener differing from the first size of fixture fastener.
18. A mounting assembly as defined in claim 13, wherein:
a) said fixture support is configured for securing a first size of fixture fastener thereto.
19. A mounting assembly as defined in claim 18, wherein:
a) said second fixture support is configured for securing a second size of fixture fastener thereto, the second size of fixture fastener differing from the first size of fixture fastener.
20. A mounting assembly as defined in claim 13, wherein:
a) said truncated portion is configured for preventing interference between said upper portion of said fixture support and said top wall of said junction box in a region of said top wall adjacent said side wall.
21. A mounting assembly, comprising:
a) a junction box including a top wall and a side wall, said top wall and said side wall defining an inner radiused portion;
b) said side wall extending downwardly away from said top wall and defining a cavity therein;
c) said inner radiused portion opening into the cavity; and
d) a fixture support disposed in said cavity, said fixture support being configured for fitting into said inner radiused portion of said junction box.
22. A mounting assembly as defined in claim 21, wherein:
a) said fixture support is disposed in said inner radiused portion without the provision of a hole in said radiused portion.
23. A mounting assembly as defined in claim 21, wherein:
a) said fixture support is disposed in said inner radiused portion without the provision of a hole in said top wall.
24. A mounting assembly as defined in claim 21, wherein:
a) said fixture support is disposed in said inner radiused portion without the provision of a hole in said side wall.
25. A mounting assembly as defined in claim 21, wherein:
a) said fixture support is disposed sufficiently close to said side wall of said junction box so as to restrict movement of said fixture support relative to said side wall.
26. A mounting assembly as defined in claim 21, wherein:
a) said fixture support is disposed sufficiently close to said inner radiused portion of said junction box so as to restrict movement of said fixture support relative to said radiused portion.
27. A mounting assembly as defined in claim 21, wherein:
a) an adhesive is provided on said top wall of said junction box.
28. A mounting assembly as defined in claim 27, wherein:
a) said adhesive includes a piece of tape.
29. A mounting assembly as defined in claim 13, wherein:
a) an adhesive is provided on said top wall of said junction box.
30. A mounting assembly as defined in claim 29, wherein:
a) said adhesive includes a piece of tape.
31. A mounting assembly as defined in claim 13, wherein:
a) said truncated portion is disposed substantially adjacent to said top wall of said junction box.

32. A mounting assembly as defined in claim 13, wherein:
a) said upper portion of said fixture support engages said top wall of said junction box.

33. A mounting assembly as defined in claim 13, wherein:
a) said upper portion of said fixture support engages said side wall of said junction box.

34. A mounting assembly as defined in claim 13, wherein:
a) said fixture support has a substantially round cylindrical configuration.

35. A mounting assembly as defined in claim 13, wherein:
a) said fixture support has a substantially polygonal configuration.

36. A mounting assembly as defined in claim 9, wherein:
a) said fixture support has a substantially round cylindrical configuration.

37. A mounting assembly as defined in claim 9, wherein:
a) said fixture support has a substantially polygonal configuration.

38. A mounting assembly as defined in claim 21, wherein:
a) said fixture support has a substantially round cylindrical configuration.

39. A mounting assembly as defined in claim 21, wherein:
a) said fixture support has a substantially polygonal configuration.

40. A mounting assembly as defined in claim 21, wherein:
a) said fixture support includes at least two first fixture supports, each said first fixture support being configured for securing a first size of fastener thereto.

41. A mounting assembly as defined in claim 40, wherein:
a) a second fixture support is provided, said second fixture support being configured for receiving a second size of fastener differing from the first size of fastener.

42. A mounting assembly as defined in claim 41, wherein:
a) said second fixture support includes at least two second fixture supports.

43. A mounting assembly as defined in claim 1, wherein:
a) a second fastener is provided at a lower portion of said fixture support for securing a fixture fastener thereto.

44. A mounting assembly as defined in claim 43, wherein:
a) said first fastener includes a first threaded hole; and
b) said second fastener includes a second threaded hole.

45. A mounting assembly as defined in claim 9, wherein:
a) said fixture support is disposed inside said cavity.

46. A mounting assembly, comprising:
a) a junction box including a top wall and a side wall;
b) said side wall extending downwardly away from said top wall and defining a cavity therein;
c) a fixture support provided adjacent said side wall of said junction box, said fixture support having an upper portion disposed adjacent said top wall of said junction box; and
d) a fastener having a head disposed above said top wall, said fixture support is disposed below said top wall, and said top wall is sandwiched and locked between said head and said upper portion of said fixture support.

47. A mounting assembly as defined in claim 46, wherein:
a) a lock washer is provided adjacent said top wall of said junction box.

48. A mounting assembly as defined in claim 46, wherein:
a) said lock washer is provided between said head of said fastener and said top wall of said junction box.

49. A mounting assembly as defined in claim 46, wherein:
a) said fixture support is disposed inside said cavity.

50. A mounting assembly as defined in claim 46, wherein:
a) said fixture support includes a first threaded hole; and,
b) said fastener extends into said first threaded hole.

51. A mounting assembly as defined in claim 46, wherein:
a) said fixture support is disposed substantially completely inside said cavity.

52. A mounting assembly as defined in claim 46, wherein:
a) said top wall and said side wall define a radiused portion therebetween, and said upper portion of said fixture support is configured for fitting into said radiused portion of said junction box.

53. A mounting assembly as defined in claim 46, wherein:
a) said lower portion of said fixture support is disposed adjacent a lower portion of said side wall.

54. A mounting assembly as defined in claim 46, wherein:
a) an adhesive is provided on said top wall of said junction box.

55. A mounting assembly as defined in claim 54, wherein:
a) said adhesive includes a piece of tape.

56. A mounting assembly as defined in claim 46, wherein:
a) said fixture support is configured for securing a first size of fixture fastener thereto.

57. A mounting assembly as defined in claim 56, wherein:
a) a second fixture support is disposed in said cavity; and
b) said second fixture support is configured for securing a second size of fixture fastener thereto, the second size of fixture fastener differing from the first size of fixture fastener.

58. A mounting assembly as defined in claim 46, wherein:
a) a second fastener is provided at a lower portion of said fixture support for securing a fixture fastener thereto.

59. A mounting assembly as defined in claim 57, wherein:
a) said first fixture support includes a pair of first fixture supports; and
b) said second fixture support includes a pair of second fixture supports.

60. A mounting assembly as defined in claim 46, wherein:
a) said fixture support includes a first threaded hole.

61. A mounting assembly as defined in claim 60, wherein:
a) the fastener engages the first threaded hole.

62. A mounting assembly as defined in claim 61, wherein:
a) said fixture support includes a second threaded hole.

63. A mounting assembly as defined in claim 62, wherein:
a) said first threaded hole is at an upper part of the fixture support.

64. A mounting assembly as defined in claim 63, wherein:
a) said second threaded hole is at a lower part of the fixture support.

65. A mounting assembly as defined in claim 64, wherein:
a) said second threaded hole is sized for receiving a fixture fastener.

66. A mounting assembly as defined in claim 65, wherein:
a) said second threaded hole is sized for receiving a male fastener.

67. A mounting assembly as defined in claim 66, wherein:
a) the fastener which engages the first threaded hole is a male fastener.

68. A mounting assembly as defined in claim 61, wherein:
a) the fastener which engages the first threaded hole is a male fastener.

69. A mounting assembly, comprising:
a) a junction box including a top wall and a side wall;
b) said side wall extending downwardly away from said top wall and defining a cavity therein;

c) a fixture support provided adjacent said side wall of said junction box, said fixture support having an upper portion disposed adjacent said top wall of said junction box; and d) a fastener disposed above said top wall, said fixture support is disposed below said top wall, and said top wall is sandwiched between said fastener and said upper portion of said fixture support.

70. A mounting assembly as defined in claim 69, wherein:
a) said fastener includes a male fastener.

71. A mounting assembly as defined in claim 70, wherein:
a) said male fastener includes a head; and
b) said top wall is sandwiched between said head and said fixture support.

72. A mounting assembly as defined in claim 69, wherein:
a) an adhesive is disposed on said top wall.

73. A mounting assembly, comprising:
a) a junction box including a top wall and a side wall;
b) said side wall extending downwardly away from said top wall and defining a cavity therein;
c) a fixture support;
d) a fastener securing said fixture support to one of said top wall and said side wall;
e) a recess provided in an upper portion of said fixture support; and
f) said recess being configured for preventing interference between said upper portion of said fixture support and said junction box when said fastener secures said fixture support to said one of said top wall and said side wall.

74. A mounting assembly as defined in claim 73, wherein:
a) said recess is provided with a radiused portion; and
b) said radiused portion is disposed adjacent an inner face of a radiused portion of said junction box disposed between said top wall and said side wall.

75. A mounting assembly as defined in claim 73, wherein:
a) said fixture support engages said side wall when said fastener secures said fixture support to said top wall.

76. A mounting assembly as defined in claim 73, wherein:
a) said fixture support extends substantially the entire length from said top wall of said junction box to a bottom portion thereof.

77. A mounting assembly as defined in claim 73, wherein:
a) a second fixture support is disposed adjacent said side wall.

78. A mounting assembly as defined in claim 73, wherein:
a) said fixture support is disposed inside said cavity.

79. A mounting assembly as defined in claim 73, wherein:
a) said fixture support extends substantially parallel to said side wall.

80. A mounting assembly as defined in claim 73, wherein:
a) said fixture support has a substantially round cylindrical configuration.

81. A mounting assembly as defined in claim 73, wherein:
a) said fixture support has a substantially polygonal configuration.

82. A mounting assembly as defined in claim 73, wherein:
a) said top wall and said side wall define a radiused portion therebetween; and
b) said recess in said fixture support fits into said radiused portion of said junction box.

83. A mounting assembly as defined in claim 73, wherein:
a) said fixture support includes a right polygonal cylinder.

84. A mounting assembly as defined in claim 73, wherein:
a) said fixture support has a substantially hexagonal configuration.

85. A mounting assembly as defined in claim 73, wherein:
a) a female fastener is provided at a lower portion of said fixture support.

86. A mounting assembly as defined in claim 73, wherein:
a) an adhesive is provided on said top wall.

87. A mounting assembly as defined in claim 86, wherein:
a) said adhesive includes a tape.

88. A mounting assembly as defined in claim 87, wherein:
a) said tape includes a double-sided tape.

* * * * *